United States Patent
Lunsford et al.

(10) Patent No.: US 7,479,943 B1
(45) Date of Patent: Jan. 20, 2009

(54) VARIABLE TEMPLATE INPUT AREA FOR A DATA INPUT DEVICE OF A HANDHELD ELECTRONIC SYSTEM

(75) Inventors: Eric Michael Lunsford, San Carlos, CA (US); Bruce Woodworth, Fremont, CA (US); John Cook, Los Gatos, CA (US); Amy Han, Palo Alto, CA (US)

(73) Assignee: PalmSource, Inc., Sunnyvale, CA (US)

( * ) Notice: Subject to any disclaimer, the term of this patent is extended or adjusted under 35 U.S.C. 154(b) by 53 days.

(21) Appl. No.: 09/613,028

(22) Filed: Jul. 10, 2000

(51) Int. Cl.
*G09G 5/08* (2006.01)
(52) U.S. Cl. ..................... 345/157; 345/169
(58) Field of Classification Search ......... 345/156–169, 345/173–183; 341/20, 21, 22; 400/489; 379/61; 178/18.01–18.09, 19.01–19.07, 178/20.01–20.03
See application file for complete search history.

(56) References Cited

U.S. PATENT DOCUMENTS

| 5,493,365 | A | * | 2/1996 | Matsui et al. | 399/1 |
|---|---|---|---|---|---|
| 5,572,573 | A | * | 11/1996 | Sylvan et al. | 455/556.2 |
| 5,694,562 | A | * | 12/1997 | Fisher | 345/839 |
| 5,865,546 | A | * | 2/1999 | Ganthier et al. | 400/489 |
| 5,989,774 | A | * | 11/1999 | Loccufier et al. | 430/264 |
| 6,118,436 | A | * | 9/2000 | Kushita | 345/173 |
| 6,507,338 | B1 | * | 1/2003 | Liao et al. | 345/173 |
| 2002/0126440 | A1 | * | 9/2002 | Webb et al. | 361/680 |

FOREIGN PATENT DOCUMENTS

| JP | 4-186420 | * | 7/1992 |
|---|---|---|---|
| JP | 10-248843 | * | 9/1998 |

* cited by examiner

*Primary Examiner*—Vijay Shankar
(74) *Attorney, Agent, or Firm*—Berry & Associates P.C.

(57) ABSTRACT

In an embodiment, an electronic system includes a data input device. The data input device includes a data input surface which is touch-sensitive. In addition, the data input device includes a removable template positioned over the data input surface. The removable template divides the data input surface into a first variable template input area and a second variable template input area. In an embodiment, the first input area comprises a handwriting recognition input area for detecting and facilitating recognition of one or more first gestures while the second variable template input area is configured to detect and facilitate recognition of one or more second gestures. The first and second variable template input areas can be implemented as any type of template. In another embodiment, a removable data input device includes a data input surface which is touch-sensitive. An electronic system includes the removable data input device. The data input surface includes a first variable template input area comprising a handwriting recognition input area for detecting and facilitating recognition of one or more first gestures and a second variable template input area for detecting and facilitating recognition of one or more second gestures. In this embodiment, the user changes the removable data input device in order to operate and control any one of a plurality of devices which are integrated into the electronic system or in order to change the data input methods available to the user.

34 Claims, 16 Drawing Sheets

500B

500B

100

100

100

VARIABLE TEMPLATE INPUT AREA FOR A DATA INPUT DEVICE OF A HANDHELD ELECTRONIC SYSTEM

BACKGROUND OF THE INVENTION

1. Field of the Invention

The present invention generally relates to the field of data input devices. More particularly, the present invention relates to the field of multi-functional data input devices.

2. Related Art

Computer systems and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of computer systems is dramatically enhanced by coupling these stand-alone computer systems together in order to form a networking environment. Within a networking environment, users may readily exchange files, share information stored on a common database, pool resources, and communicate via electronic mail (e-mail) and via video teleconferencing. Furthermore, computer systems or other types of electronic devices which are coupled to the Internet provide their users access to data and information from all over the world.

A personal digital assistant (commonly referred to as a PDA) is a portable computer system. It is appreciated that the personal digital assistant is a portable handheld device that is used as an electronic organizer which has the capability to store a wide range of information that includes daily appointments, numerous telephone numbers of business and personal acquaintances, and various other information. Furthermore, the personal digital assistant has the ability to connect to a personal computer system, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). Also, the personal digital assistant can be coupled to a networking environment.

Typically, the personal digital assistant includes a data input device such as a handwriting recognition device which can be utilized to control and operate the personal digital assistant. The handwriting recognition device receives user input handwriting stroke data, whereas a user utilizes a stylus to stroke alphanumeric characters and analog characters (e.g., *, &, @, $, etc.) on the handwriting recognition device. The handwriting recognition device processes the user input handwriting stroke data and transmits the processed data to another component (e.g., an electronic display device, a memory unit, a processor, etc.) of the personal digital assistant so that a particular operation or function can be performed. Personal digital assistants are enormously popular, in part because of their handwriting recognition device.

However, the handwriting recognition device is not the ideal input mechanism for everyone. In fact, many potential users have elected not to purchase a personal digital assistant precisely because they reject this data input method for various reasons. Some potential users simply do not understand how the handwriting recognition device interfaces with the user. Other potential users have experimented with the handwriting recognition device, but have been left frustrated by not being able to get the handwriting recognition device to work right away, leaving them with the impression that the handwriting recognition device does not work. Moreover, some potential users believe that their own handwriting is too hard for a human to read, much less a handwriting recognition device. Other potential users doubt that any form of handwriting recognition really works, believing the handwriting recognition device is too error-prone. This resistance directed at the handwriting recognition device has led to lost opportunities for new sales and new users for the personal digital assistant.

To appeal to potential users, a software keyboard has been incorporated into the personal digital assistant. The software keyboard is displayed on the touch-sensitive electronic display device of the personal digital assistant when invoked by the user. The user utilizes a stylus to select a particular keyboard character. Unfortunately, when the software keyboard is displayed, the user experiences a marked reduction in the amount of space, on the touch-sensitive electronic display device, available to display data.

The company SOFTAVA has developed the product Silkyboard as a solution for the perceived problems with the handwriting recognition device. The Silkyboard includes a keyboard template that is positioned over the handwriting recognition device. Thus, a user can tap on the appropriate location on the keyboard template to select and input a particular keyboard character. Moreover, the user can stroke characters on the keyboard template, causing the handwriting recognition device to detect and to recognize the stroked characters as particular alphanumeric characters or particular analog characters. However, the Silkyboard has several disadvantages. First, the user finds it cumbersome, distracting, error-prone, difficult, and unintuitive to stroke characters over the keyboard template. Secondly, the user becomes dependent on the keyboard template rather than learning and employing the productivity enhancements of the handwriting recognition device, preventing the user from fully experiencing the power of the handwriting recognition device.

In addition, the company FTLab has developed the product ThumbType as a solution for the perceived problems with the handwriting recognition device. The ThumbType includes a special sheet having keyboard keys molded from a high-precision plastic and arranged with an approximate 6 millimeter (mm) pitch on the special sheet. The special sheet is positioned over the handwriting recognition device. The ThumbType is designed so that the user holds the personal digital assistant in both hands and types using both thumbs. If the user desires to employ the handwriting recognition features of the handwriting recognition device, the ThumbType enables the user to display the handwriting recognition feature on the touch-sensitive electronic display device of the personal digital assistant. Thus, the user can stroke characters on the touch-sensitive electronic display device rather than on the handwriting recognition device, causing the handwriting recognition device to detect and to recognize via the touch-sensitive electronic display device the stroked characters as particular alphanumeric characters or particular analog characters. Besides the disadvantages discussed in connection with the Silkyboard, the ThumbType also has the disadvantage that the handwriting recognition feature displayed on the touch-sensitive electronic display device further reduces the productivity space available for the user on the touch-sensitive electronic display device and interferes with normal viewing of the data displayed on the touch-sensitive electronic display device.

SUMMARY OF THE INVENTION

A data input device having multi-functional capability is described. In an embodiment, an electronic system includes the data input device. The electronic system is implemented as a personal digital assistant. The data input device includes a data input surface which is touch-sensitive. In addition, the data input device includes a removable template positioned over the data input surface. The data input device detects and facilitates recognition of a gesture performed by a user on the data input device. The removable template divides the data input surface into a first variable template input area and a second variable template input area. In an embodiment, the first variable template input area comprises a handwriting recognition input area for detecting and facilitating recognition of one or more first gestures while the second variable template input area is configured to detect and facilitate recognition of one or more second gestures. The first and second variable template input areas can be implemented as any type of template.

Thus, the data input device can support multiple data input methods by enabling a user to change the removable template. Moreover, by enabling the user to change the removable template, the data input device is able to operate and control multiple devices which are integrated into the electronic system. For example, the first and second variable template input areas can be a keyboard template, a television remote control template, a telephone dialing panel template, or an electronic game control template.

In another embodiment, a removable data input device includes a data input surface which is touch-sensitive. An electronic system includes the removable data input device. The electronic system is implemented as a personal digital assistant. The removable data input device detects and facilitates recognition of a gesture performed by a user on the removable data input device. The data input surface includes a first variable template input area and a second variable template input area. In an embodiment, the second variable template input area comprises a handwriting recognition input area for detecting and facilitating recognition of one or more first gestures while the second variable template input area is configured to detect and facilitate recognition of one or more second gestures. The first and second variable template input areas can be implemented as any type of template.

In this embodiment, the user changes the removable data input device in order to operate and control any one of a plurality of devices which are integrated into the electronic system or in order to change the data input methods available to the user. For example, a first removable data input device has a variable template input area implemented as a keyboard template, a second removable data input device has a variable template input area implemented as a television remote control template, a third removable data input device has a variable template input area implemented as a telephone dialing panel template, and a fourth removable data input device has a variable template input area implemented as an electronic game control template.

These and other advantages of the present invention will no doubt become apparent to those of ordinary skill in the art after having read the following detailed description of the preferred embodiments which are illustrated in the drawing figures.

In one embodiment, the present invention includes a data input device comprising: a data input surface for detecting a gesture performed thereon by a user and for facilitating recognition of the gesture as corresponding to a particular data input; and a user removable template positioned over the data input surface for dividing the data input surface into a first data input area and a second data input area, wherein the first data input area is configured to facilitate recognition of one or more first gestures, and wherein the second data input area is configured to facilitate recognition of one or more second gestures.

In another embodiment, the present invention includes an electronic system comprising: a processor; a bus coupled to the processor; an electronic display device coupled to the bus; a memory device coupled to the bus; and a data input device coupled to the bus, the data input device comprising: a data input surface for detecting a gesture performed thereon by a user and for facilitating recognition of the gesture as corresponding to a particular data input, and a user removable template positioned over the data input surface for dividing the data input surface into a first data input area and a second data input area, wherein the first data input area is configured to facilitate recognition of one or more first gestures, and wherein the second data input area is configured to facilitate recognition of one or more second gestures.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

A Variable Template Input Area

Although the present invention will be discussed in connection with a handheld electronic system (e.g. a personal digital assistant), the present invention can be practiced with any other type of electronic system/computer system.

Figure 1A:
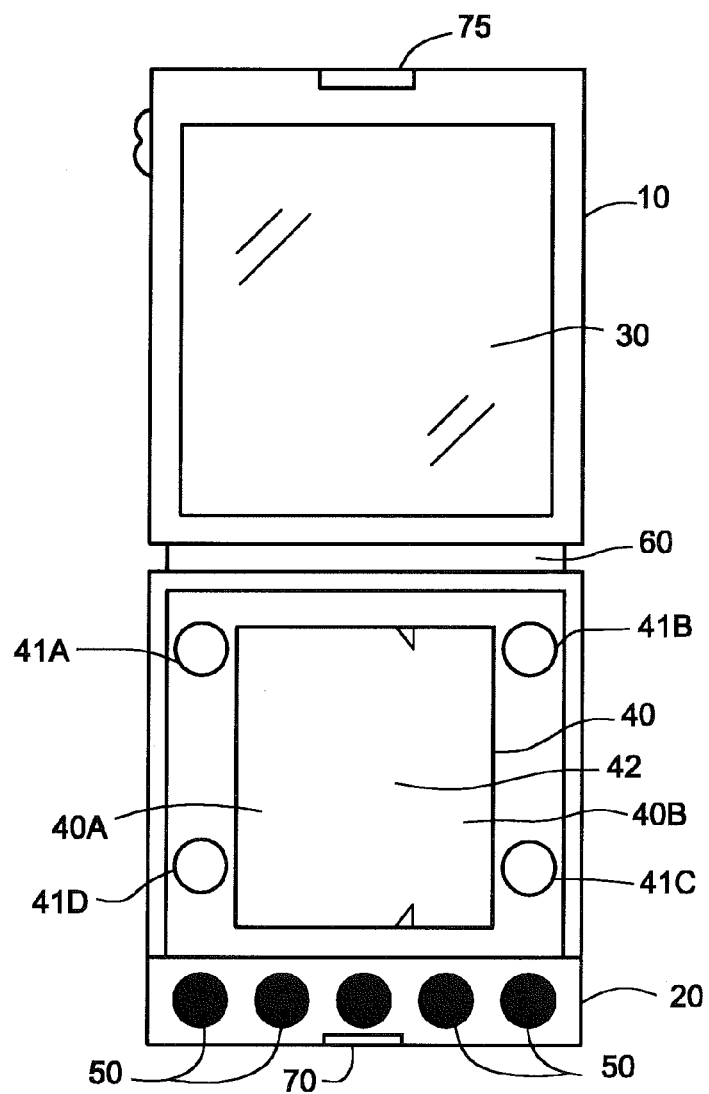
FIG. 1A illustrates a front view of a handheld electronic system in which embodiments of the present invention can be practiced.

FIG. 1A illustrates a front view of a handheld electronic system in which embodiments of the present invention can be practiced. In an embodiment, the handheld electronic system comprises a personal digital assistant 100. According to an embodiment of the present invention, the personal digital assistant 100 is implemented as a clamshell configuration as disclosed in the pending patent application "FLEXIBLE FORM-FACTOR PORTABLE COMPUTER SYSTEM" (Ser. No. 09/578,529, filed on May 24, 2000 by E. Michael Lunsford, Bruce Woodworth, John Cook, and Amy Han, assigned to the assignee of the present patent application), which is incorporated herein by reference.

As illustrated in FIG. 1A, the personal digital assistant 100 includes an electronic display module 10 and a handwriting recognition module 20. The electronic display module 10 and the handwriting recognition module 20 are compact and well-suited to rest on a hand of a user. Moreover, the personal digital assistant 100 further includes a hinge 60.

Specifically, the electronic display module 10 includes an electronic display device 30 for displaying visual data. It should be understood that the electronic display device 30 can be implemented in any manner. For example, the electronic display device 30 can be implemented as a liquid crystal display (LCD) screen (e.g., a color liquid crystal display, a monochrome liquid crystal display, etc.) or can be implemented as a light emitting diode (LED) display (e.g., a color LED display, a monochrome LED display, etc.). In an embodiment, the electronic display device 30 is implemented as a touch-sensitive electronic display device 30 which can detect a position of an object (e.g., a stylus) contacting a surface of the touch-sensitive electronic display device 30.

Moreover, the handwriting recognition module 20 includes a data input device 40. In a preferred embodiment of the present invention as illustrated in FIG. 1A, the data input device 40 is configured to occupy a substantial portion of the handwriting recognition module 20 by increasing the size of the data input device 40. The clamshell configuration facilitates implementation of the present invention without negatively impacting one of the most important features of the personal digital assistant 100: compact size. If the present invention is implemented in a personal digital assistant which is configured as a single module, the length of the personal digital assistant would have to be increased to accommodate the present invention, reducing the appeal of the personal digital assistant to a variety of users.

FIG. 1A illustrates a default configuration for the data input device 40. In an embodiment, the data input device 40 includes a data input surface 42. Moreover, the data input device 40 is configured to receive user input handwriting stroke data, whereas a user utilizes a stylus to stroke alphanumeric characters on the data input device 40. In an embodiment, the data input device 40 includes a first region 40A for receiving user input handwriting stroke data corresponding to a plurality of alphabetic characters. Moreover, the first region 40A also receives user input handwriting stroke data corresponding to a plurality of analog characters (e.g., *, &, @, $, etc.). In an embodiment, the data input device 40 includes a second region 40B for receiving user input handwriting stroke data corresponding to a plurality of numeric characters. Also, the second region 40B receives user input handwriting stroke data corresponding to a plurality of analog characters (e.g., *, &, @, $, etc.).

In addition, the data input device 40 includes a plurality of third regions 41A-D for invoking a particular function (e.g., to launch a particular application, to navigate through the stored applications, etc.) by tapping with the stylus. Furthermore, the handwriting recognition module 20 includes a plurality of function buttons 50 for selecting information or causing the personal digital assistant 100 to implement particular functions (e.g., to invoke a telephone address application, a calendar application, a to-do-list application, a memo pad application, etc.).

As illustrated in FIG. 1A, the personal digital assistant 100 includes an infrared communication port 75 for communicating via any infrared protocol and a serial communication port 70 for communicating with another electronic system (e.g., a host computer system) via a communication connection utilizing a serial protocol (e.g., a wireless serial connection, a wired serial connection, etc.). Moreover, the serial communication port 70 facilitates synchronizing the data stored in the personal digital assistant 100 with the data stored in a host computer system (See FIG. 1C).

Figure 1B:
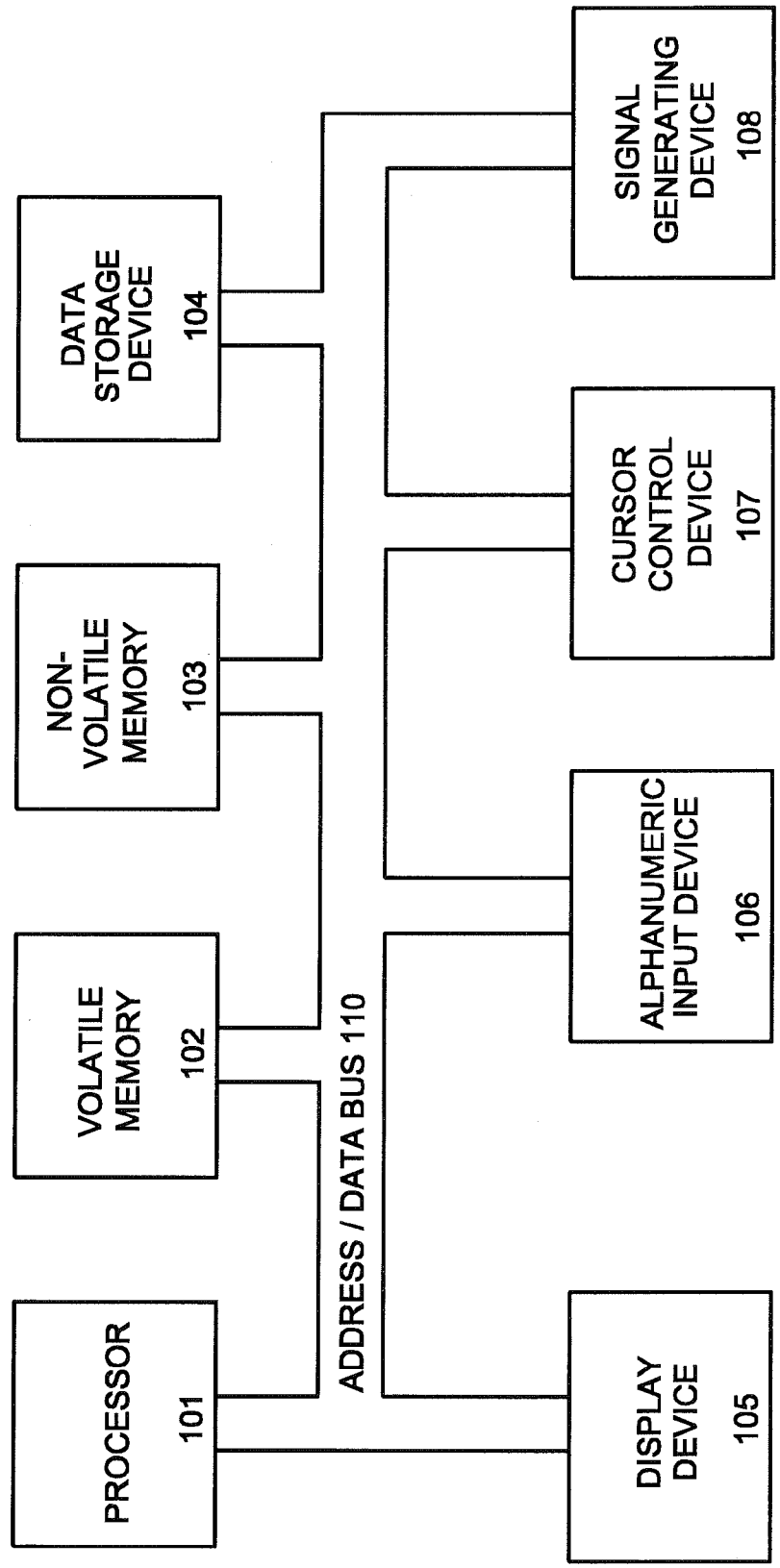
FIG. 1B illustrates a logical circuit block diagram of a handheld electronic system in which embodiments of the present invention can be practiced.

FIG. 1B illustrates a logical circuit block diagram of a handheld electronic system (e.g., personal digital assistant 100) in which embodiments of the present invention can be practiced.

The personal digital assistant 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. The personal digital assistant 100 can also include a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer-readable memories. Memory units of the personal digital assistant 100 can include volatile memory 102, non-volatile memory 103 and data storage device 104.

The personal digital assistant 100 can further include a signal generating device 108 (e.g., a wireless network interface card "NIC", a serial communication port, an infrared (IR) communication port, a radio frequency (RF) communication port, etc.) coupled to the bus 110 for interfacing with other computer systems or electronic systems. The personal digital assistant 100 can also include an alphanumeric input device 106 including alphanumeric and function keys coupled to the bus 110 for communicating information and command selections to the central processor 101. The alphanumeric input device 106 can be implemented as a data input device in accordance with embodiments of the present invention. The personal digital assistant 100 can also include a cursor control or directing device 107 coupled to the bus 110 for communicating user input information and command selections to the central processor 101.

A display device 105 can also be coupled to the bus 110 for displaying information to the computer system/electronic system user. Display device 105 may be a liquid crystal device, other flat panel display, light emitting diode display, cathode ray tube, or other display device suitable for creating graphic images and alphanumeric characters recognizable by the user. The cursor control device 107 allows the user to dynamically signal the two dimensional movement of a visible symbol (cursor) on a display screen of display device 105. Many implementations of cursor control device 107 are known in the art including a trackball, mouse, touch pad, joystick, a stylus, or special keys on alphanumeric input device 106 capable of signaling movement of a given direction or manner of displacement. Alternatively, it will be appreciated that a cursor can be directed and/or activated via input from alphanumeric input device 106 using special keys and key sequence commands. It should be understood that the personal digital assistant 100 can be implemented in any other manner.

Figure 1C:
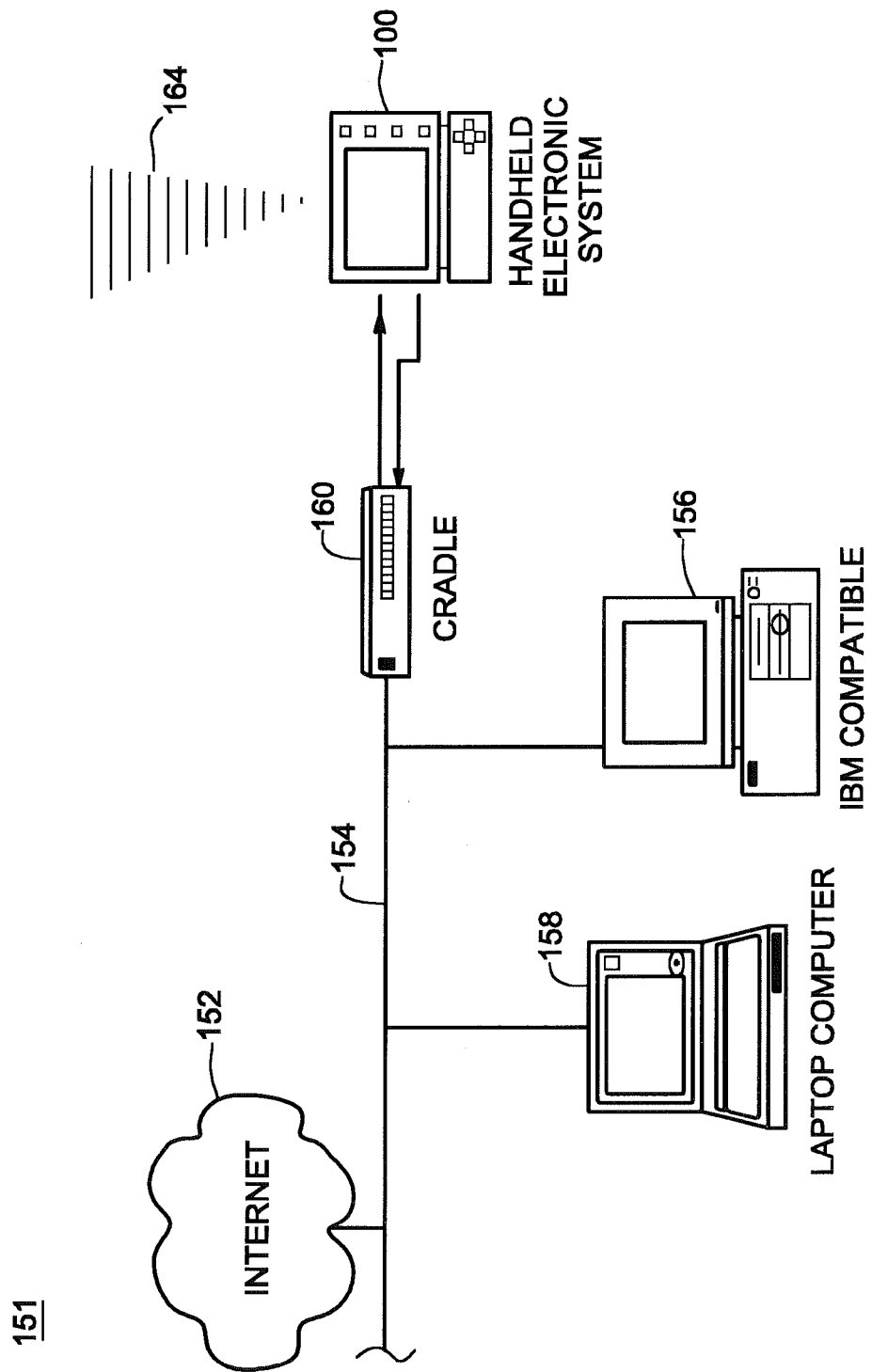
FIG. 1C illustrates a network environment, including a handheld electronic system coupled to a host computer system and the Internet via a cradle device, in which embodiments of the present invention can be practiced.

FIG. 1C illustrates a network environment 151, including a handheld electronic system (e.g., personal digital assistant 100) coupled to a host computer system and the Internet via a cradle device, in which embodiments of the present invention can be practiced.

Network environment 151 comprises a host computer system 156 which can either be a desktop computer system as shown, or, alternatively, can be a laptop computer system 158. Optionally, more than one host computer system 156 can be used within network environment 151. Host computer systems 158 and 156 are shown connected to a communication bus 154, which in one embodiment can be a serial communication bus, but could be of any of a number of well known designs (e.g., a parallel bus, Ethernet Local Area Network (LAN), etc.). In an embodiment, bus 154 can provide communication with the Internet 152 using a number of well known protocols.

Importantly, bus 154 is also coupled to a cradle 160 for receiving and initiating communication with the personal digital assistant 100. Cradle 160 provides an electrical and mechanical communication interface between bus 154 (and any device coupled to bus 154) and the personal digital assistant 100 for two-way communications. The personal digital assistant 100 also contains a wireless infrared communication mechanism 164 for sending information to other devices and for receiving information from other devices.

Figure 2:
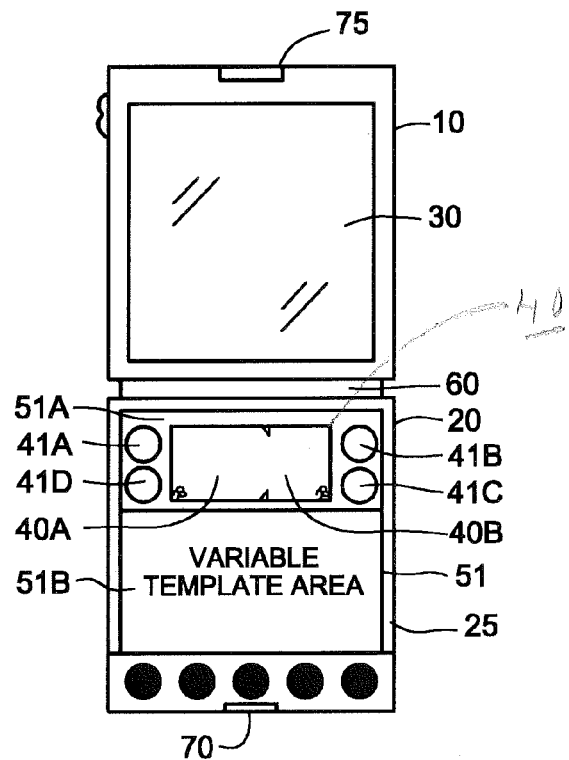
FIG. 2 illustrates a front view of a handheld electronic system of FIG. 1A, showing the removable template and the first and second variable template input areas in accordance with an embodiment of the present invention.
Figure 2:
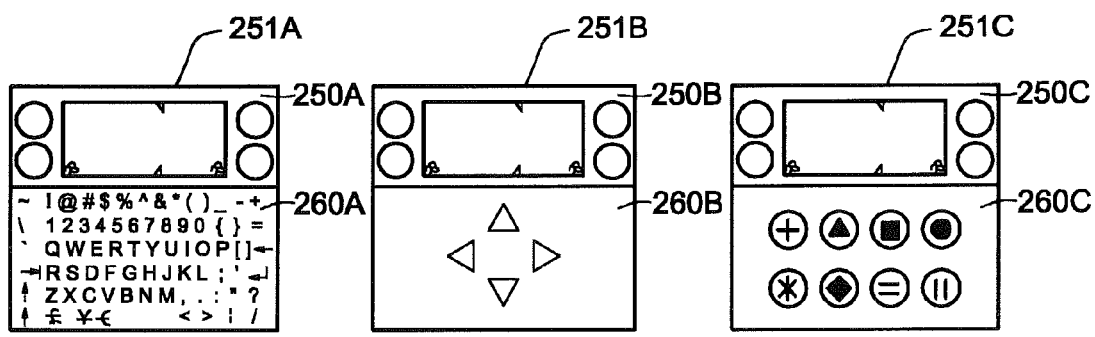

FIG. 2 illustrates a front view of a handheld electronic system (e.g., personal digital assistant 100) of FIG. 1A, showing the removable template 51, the first variable template input area 51A, and the second variable template input area 51B in accordance with an embodiment of the present invention. The present invention enables the data input device 40 to have a plurality of easy to use and intuitive data input methods that will appeal to users or potential users who dislike or who are unenthusiastic about the handwriting recognition features of the data input device 40, without obscuring a portion of the electronic display device 30. Moreover, the present invention enables the data input device 40 to operate and control any one of a plurality of devices that are integrated into the personal digital assistant 100, increasing the versatility of the personal digital assistant 100.

In an embodiment of the present invention, the data input device 40 (viewable in FIG. 1A) includes a data input surface 42 (viewable in FIG. 1A as shown spaced apart from the display device 30) and a removable template 51 (FIG. 2) positioned over the data input surface 42 (viewable in FIG. 1A). The data input surface 42 is touch-sensitive. Moreover, the data input surface 42 detects a gesture performed by a user on the data input surface 42. The user can perform the gesture with an object (e.g., a stylus) or without the object. The gesture should be understood to be any movement performed by the user to represent a particular data input entry (e.g., an alphanumeric character, selection of a particular application or function, etc.) for the handheld electronic system (e.g., personal digital assistant 100). Tap, drag, push, double tap, hop, zig-zag, and handwriting strokes are some examples of gestures. Moreover, the data input surface 42 facilitates recognition of the gesture performed by the user as corresponding to a particular data input (e.g., an alphanumeric character, selection of a particular application or function, etc.). In addition, the data input device 40 cooperates with hardware or software incorporated into the personal digital assistant 100 to process the gesture and to determine the particular data input intended by the user.

As illustrated in FIG. 2, the removable template 51 (area 51A and 51B) of the present invention divides the data input surface 42 (viewable in FIG. 1A) into a first variable template input area 51A and a second variable template input area 51B. In an embodiment, the first variable template input area 51A comprises a handwriting recognition input area 51A that is configured to detect and to facilitate recognition of one or more first gestures corresponding to a plurality of handwriting strokes, whereas the user performs the handwriting strokes with an object (e.g., a stylus).

Resembling the default configuration of the data input device 40 as illustrated in FIG. 1A, the handwriting recognition input area 51A includes a first region 40A for detecting and facilitating recognition of user input handwriting stroke data corresponding to a plurality of alphabetic characters. Moreover, the first region 40A also detects and facilitates recognition of user input handwriting stroke data corresponding to a plurality of analog characters (e.g., *, &, @, $, etc.). In addition, the handwriting recognition input area 51A includes a second region 40B for detecting and facilitating recognition of user input handwriting stroke data corresponding to a plurality of numeric characters. Also, the second region 40B detects and facilitates recognition of user input handwriting stroke data corresponding to a plurality of analog characters (e.g., *, &, @, $, etc.). Furthermore, the handwriting recognition input area 51A includes a plurality of third regions 41A-D for invoking a particular function (e.g., to launch a particular application, to navigate through the stored applications, etc.) by performing a particular gesture with the stylus.

Moreover, the second variable template input area 51B is configured to detect and to facilitate recognition of one or more second gestures (e.g., tap, drag, push, double tap, hop, zig-zag, handwriting strokes, etc.) performed by the user on the second variable template input area 51B. The second variable template input area 51B can be implemented as any type of template for indicating to a user the location on the touch-sensitive data input surface 42 (viewable in FIG. 1A) in which to perform the second gesture (e.g., tap, drag, push, double tap, hop, zig-zag, handwriting strokes, etc.) in order to execute a particular data input entry. For example, the second variable template input area 51B may have figures to indicate the location on which to tap with a stylus in order to execute a data input entry corresponding to an alphanumeric character.

The removable templates 251A-251C of FIG. 2 are examples. The removable template 251A includes a handwriting recognition input area 250A and a variable template input area implemented as a keyboard template 260A. The removable template 251B includes a handwriting recognition input area 250B and a variable template input area implemented as an electronic game control template 260B. The removable template 251C includes a handwriting recognition input area 250C and a variable template input area implemented as an application shortcut launcher template 260C.

It should be understood that the discussion with respect to the first variable template input area 51A is applicable to the second variable template input area 51B (e.g., the second variable template input area 51B can be implemented as a handwriting recognition input area). It should be understood that the discussion with respect to the second variable template input area 51B is applicable to the first variable template input area 51A (e.g., the first variable template input area 51B can be implemented as a keyboard template, an electronic game control template, an application shortcut launcher template, or etc.).

Since the removable template 51 can be removed and replaced by a user, the data input device 40 is able to support multiple data input methods (e.g., handwriting recognition data input and keyboard data input), allowing the user to enter data using the data input method that appeals to the user based on the user's experience and comfort. In addition, a user that prefers to use the handwriting recognition feature or a user that has become proficient in using the handwriting recognition feature can utilize the default configuration of the data input device 40 (FIG. 1A) without the removable template 51, affording the user a larger first region 40A (FIG. 1A) and a larger second region 40B (FIG. 1A) for improved productivity and for allowing the user to perform gestures that are more reflective of the user's natural handwriting strokes. Rather than being limited to one type of data input method, the user experiences the opportunity to determine the data input method to be utilized from a plurality of data input methods.

Moreover, a user can utilize the data input device 40 to operate and control multiple devices that are integrated into the personal digital assistant 100 by changing the removable template 51 having the variable template input area 51B. Therefore, the removable template 51 increases the versatility of the data input device 40 and the personal digital assistant 100, as well as facilitates integration of multiple devices (e.g., telephone, television remote control, electronic music instrument, etc.) into the personal digital assistant 100 despite the space and size limitations of the personal digital assistant 100.

In addition, the variable template input areas 51A and 51B may be implemented as an application interface template (e.g., enabling the user to invoke a particular application feature) for a particular application executable on the personal digital assistant 100. Thus, each application of a plurality of applications has a corresponding removable template 51. When a user desires to utilize a particular application, the user installs the corresponding removable template 51 on the data input device 40. In practice, the developer of an application creates the application and designs a removable template 51 having a variable template input area (e.g., the first variable template input area 51A or the second variable template input area 51B) capable of functioning as the application interface template for the application created by the developer, opening the development of an unlimited variety of removable templates 51 by developers for the user of the personal digital assistant 100.

Moreover, the removable template 51 facilitates manufacturing improvements. The variable template input areas 51A and 51B can be implemented as a QWERTY-type of keyboard template or as any type of keyboard template. Rather than spending resources in manufacturing multiple models of the personal digital assistant 100 having foreign-language physical keyboards, a variable template input area (e.g., the first variable template input area 51A or the second variable template input area 51B) is implemented as a foreign-language keyboard template (e.g., Japanese keyboard template, German keyboard template, French keyboard template, Russian keyboard template, etc.). Hence, the user is able to switch from an unfamiliar keyboard template to a more familiar keyboard template simply by changing the removable template 51, appealing to a greater number of users and potential users of the personal digital assistant 100. The costs of manufacturing the removable template 51 are substantially lower than the costs of manufacturing multiple models of the personal digital assistant 100.

In sum, the removable template 51 provides the user the opportunity to selectively configure the personal digital assistant 100 to reflect his/her lifestyle, whether business, family, or pleasure.

In an embodiment, the removable template 51 is composed of mylar. The removable template is opaque to hide the default configuration (FIG. 1A) of the data input device 40. It should be understood that the removable template can be made from another material. According to an embodiment, on each removable template 51 the third region 41A is located in the upper left-hand corner of the handwriting recognition module 20 and is configured to enable the user to invoke a function which enables the user to view the applications, functions, or features available in the personal digital assistant 100. Thus, the user is ensured access to the function which enables the user to view the applications, functions, or features available in the personal digital assistant 100.

In practice, the user securely positions the removable template 51 over the data input surface 42 (viewable in FIG. 1A) of the data input device 40. Thereafter, the user invokes a template calibration application corresponding to the removable template 51 to calibrate the data input device 40 having the removable template 51.

In an embodiment, the removable template 51 is securely positioned over the input surface 42 (FIG. 1A) by inserting the edges of the removable template 51 under the top frame 25 of the handwriting recognition module 20.

Figure 3:
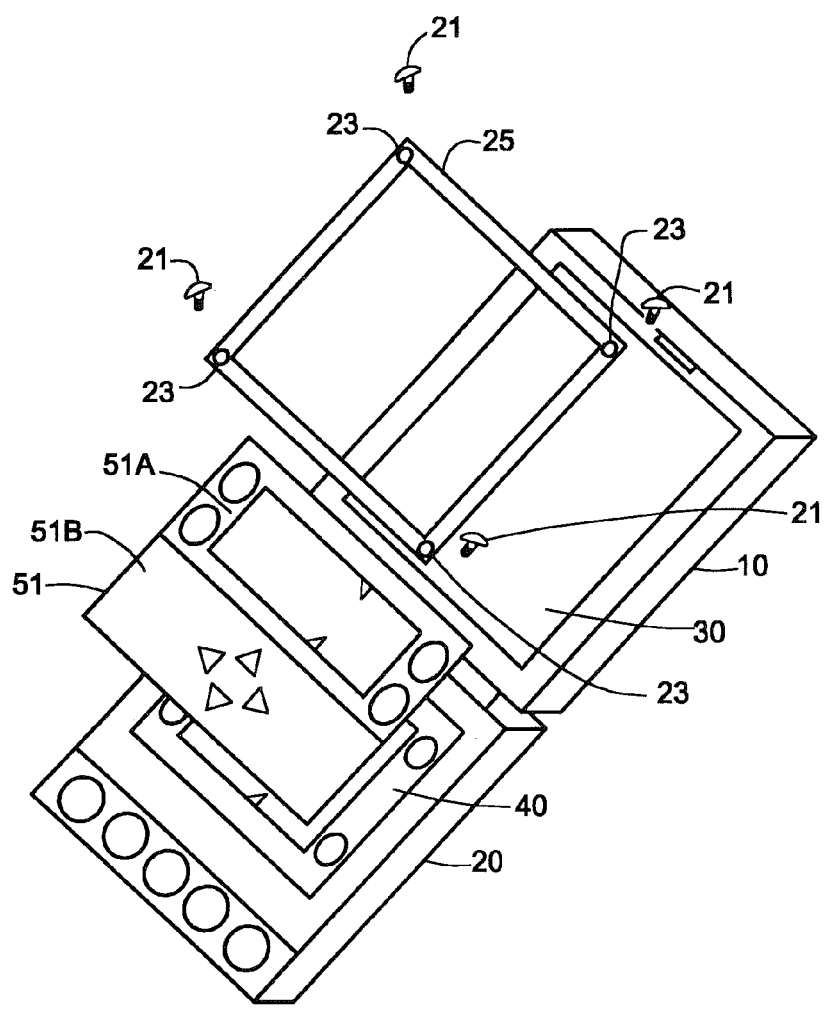
FIG. 3 illustrates a handheld electronic system, showing a method for securely positioning the removable template in accordance with another embodiment of the present invention.

FIG. 3 illustrates a handheld electronic system (e.g., a personal digital assistant 100), showing a method for securely positioning the removable template 51 in accordance with another embodiment of the present invention. The removable template 51 (having the handwriting recognition input area 51A and the variable template input area 51B) is positioned over the default configuration of the data input device 40. The top frame 25 of the handwriting recognition module 20 is positioned over the removable template 51. Moreover, the top frame 25 includes one or more holes 23 for coupling the top frame 25 to the handwriting recognition module 20 with one or more screws 21. The removable template 51 is securely positioned on the data input device 40 to avoid disrupting the calibration of the of the data input device 40 and to increase the accurateness and reliability of the data input device 40.

Figure 4:
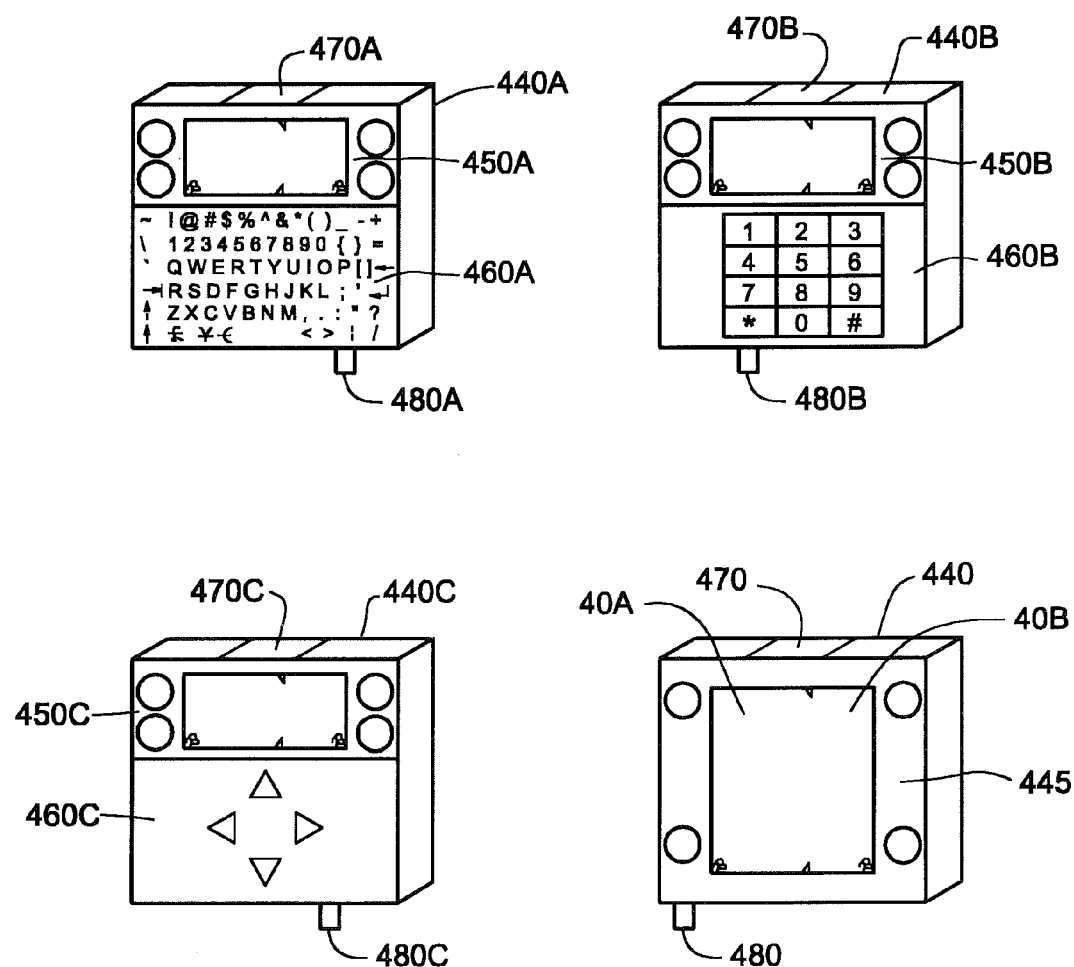
FIG. 4 illustrates a plurality of removable data input devices in accordance with a second embodiment of the present invention.
Figure 5:
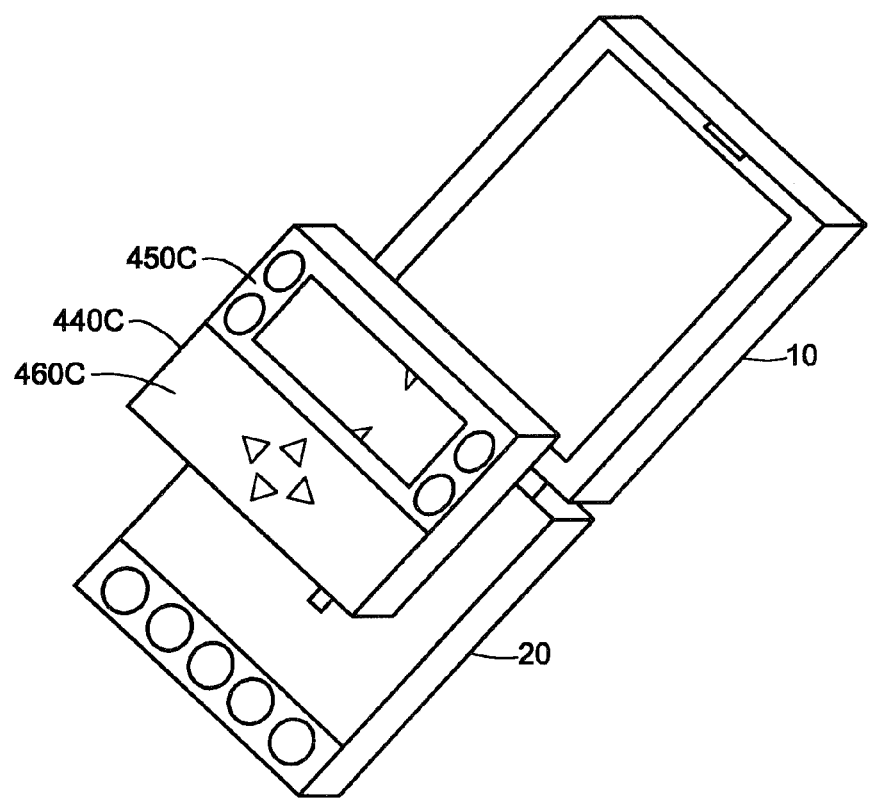
FIG. 5A illustrates a method of coupling a removable data input device to a handheld electronic system in accordance with an embodiment of the present invention.
FIG. 5B is a flow chart illustrating a method of operating the removable template with the handheld electronic system in accordance with an embodiment of the present invention.
FIG. 5C is a flow chart illustrating a method of operating the removable data input device with the handheld electronic system in accordance with an embodiment of the present invention.

FIG. 4 illustrates a plurality of removable data input devices 440-440C in accordance with a second embodiment of the present invention. The discussion regarding the removable template in connection with FIG. 2 is also applicable to the removable data input devices 440-440C. Moreover, the second embodiment of the present invention is practiced with a personal digital assistant 100 (FIG. 5) having a handwriting recognition module 20 (FIG. 5) configured to receive the removable data input device 440-440C. Each removable data input device 440-440C is configured to enable a user to remove the removable data input device from the personal digital assistant or to replace the removable data input device with another removable data input device.

In this embodiment, the removable data input device 440 is the default configuration and includes the handwriting recognition input area 445 as discussed with respect to FIG. 1A. Moreover, each of the removable data input devices 440A-440C includes a data input surface which is touch-sensitive, whereas the data input surface includes a first variable template input area 450A-450C comprising a handwriting recognition input area 450A-450C and a second variable template input area 460A-460C. The handwriting recognition input area 450A-450C is configured to detect and to facilitate recognition of one or more first gestures corresponding to a plurality of handwriting strokes, whereas the user can perform the handwriting strokes with a stylus. Moreover, the second variable template input area 460A-460C is configured to detect and to facilitate recognition of one or more second gestures (e.g., tap, drag, push, double tap, hop, zig-zag, handwriting strokes, etc.) performed by the user on the second variable template input area 460A-460C with a stylus or without a stylus. The second variable template input area 460A-460C can be implemented as any type of template for indicating to the user the location on the touch-sensitive data input surface in which to perform the second gesture (e.g., tap, drag, push, double tap, hop, zig-zag, handwriting strokes, etc.) in order to execute a particular data input entry.

The removable data input device 440A includes a second variable template input area 460A implemented as a keyboard template. The removable data input device 440B includes a second variable template input area 460B implemented as a telephone dialing pad template. The removable data input device 440C includes a second variable template input area 460C implemented as an electronic game control template.

It should be understood that the discussion with respect to the first variable template input area 450A-450C is applicable to the second variable template input area 460A-460C (e.g., the second variable template input area 460A-460C can be implemented as a handwriting recognition input area). It should be understood that the discussion with respect to the second variable template input area 460A-460C is applicable to the first variable template input area 450A-450C (e.g., the first variable template input area 450A-450C can be implemented as a keyboard template, an electronic game control template, a telephone dialing pad template, or etc.).

In an implementation, the data input surface of the removable data input device includes markings (e.g., figures) to identify the handwriting recognition input area and the variable template input area. The markings can be formed by etching, painting, pasting, or in any other manner. Alternately, a template is irremovably coupled to the data input surface to identify the handwriting recognition input area and the variable template input area.

Since the removable data input device 440A-440C can be removed and replaced by a user, the personal digital assistant is able to support multiple data input methods (e.g., handwriting recognition data input and keyboard data input), allowing the user to enter data using the data input method that appeals to the user based on the user's experience and comfort. In addition, a user that prefers to use the handwriting recognition feature or a user that has become proficient in using the handwriting recognition feature can utilize the default configuration of the removable data input device 440, affording the user a larger first region 40A and a larger second region 40B for improved productivity and for allowing the user to perform gestures that are more reflective of the user's natural handwriting strokes.

Moreover, a user can utilize the removable data input device 440A-440C to operate and control multiple devices that are integrated into the personal digital assistant by changing the removable data input device 440A-440C having the first and second variable template input areas. Therefore, the removable data input device 440A-440C increases the versatility of the personal digital assistant and facilitates integration of multiple devices (e.g., telephone, television remote control, electronic music instrument, etc.) into the personal digital assistant despite the space and size limitations of the personal digital assistant.

Each removable data input device 440-440C includes an electrical mechanism 470-470C for enabling an electrical connection between the removable data input device TD and the personal digital assistant. Moreover, each removable data input device 440-440C includes a mechanism for automatically configuring the personal digital-assistant to recognize the removable data input device when the removable data input device is coupled to the personal digital assistant. This mechanism obviates the need for the user to go through a configuration application which prompts for the description of the removable data input device or to go through a calibration procedure upon switching a first removable data input device for a second removable data input device. In an implementation, the mechanism comprises a mechanical part 480-480C that varies among the removable data input devices 440-440C. The personal digital assistant determines which removable data input device 440-440C is coupled to the personal digital assistant according to the location of the mechanical part 480-480C. Alternatively, the electrical mechanism 470-470C provides an electrical signal to the personal digital assistant to identify the removable data input device 440-440C which is coupled to the personal digital assistant.

FIG. 5A illustrates a method of coupling a removable data input device 440C to a handheld electronic system (e.g., a personal digital assistant 100) in accordance with an embodiment of the present invention. The removable data input device 440C (having the handwriting recognition input area 450C and the variable template input area 460C) is inserted into the handwriting recognition module 20. Alternatively, the removable data input device 440C can be slid into the handwriting recognition module 20. It should be understood that the removable data input device 440C can be coupled to the handwriting recognition module 20 in any manner.

Figure 5B:
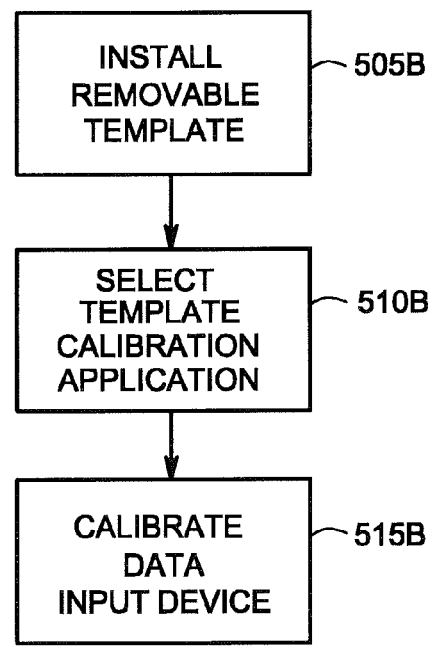

FIG. 5B is a flow chart illustrating a method 500B of operating the removable template with the handheld electronic system (e.g., a personal digital assistant 100) in accordance with an embodiment of the present invention. At step 505B, the user installs the removable template on the data input device of the personal digital assistant 100. At step 510B, the user selects a template calibration application corresponding to the removable template. At step 515C, the template calibration application guides the user through the calibration process for calibrating the data input device to operate properly while having the removable template.

Figure 5C:
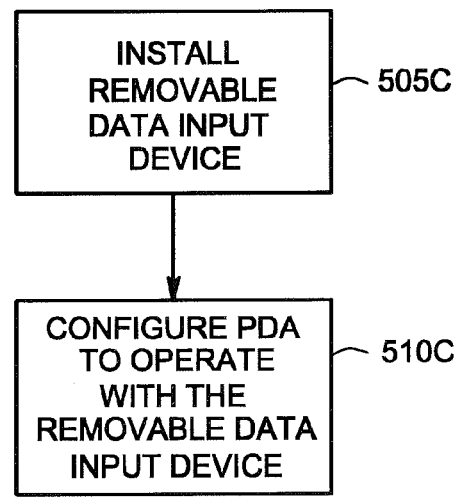

FIG. 5C is a flow chart illustrating a method 500C of operating the removable data input device with the handheld electronic system (e.g., a personal digital assistant 100) in accordance with an embodiment of the present invention. At step 505C, the user installs the removable data input device into the personal digital assistant 100. At step 510C, the personal digital assistant proceeds through a configuration process in order to operate properly with the removable data input device, whereas the configuration process includes recognizing the type of removable data input device installed.

Figure 6:
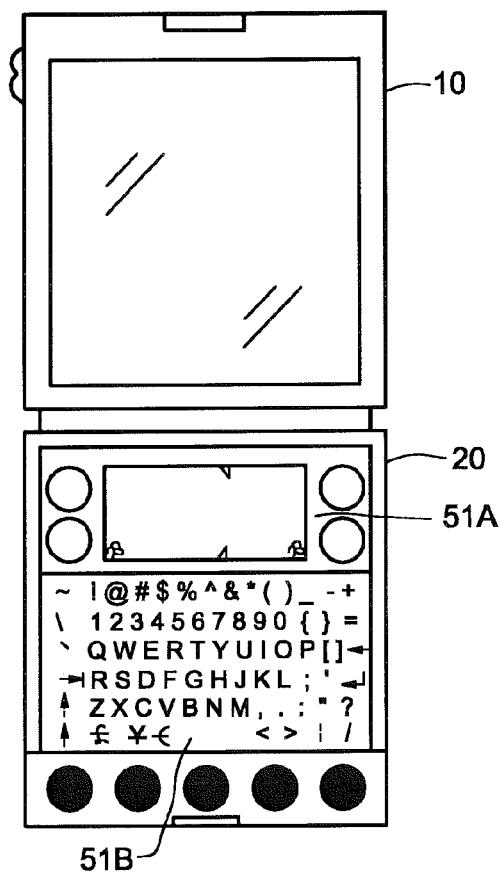
FIG. 6 illustrates a front view of a handheld electronic system, showing one of the variable template input areas implemented as a keyboard template in accordance with an embodiment of the present invention.

FIG. 6 illustrates a front view of a handheld electronic system (e.g., a personal digital assistant 100), showing one of the variable template input areas implemented as a keyboard template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as a keyboard template 51B. It should be understood that the keyboard template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

In practice, the user utilizes a stylus to tap on the figure (on the keyboard template) corresponding to the keyboard character the user desires to select. It should be understood that the user can perform a gesture other than a tap to make his/her selection. Moreover, the keyboard template can be implemented as a Japanese keyboard template, a German keyboard template, a French keyboard template, a Russian keyboard template, etc.

Figure 7:
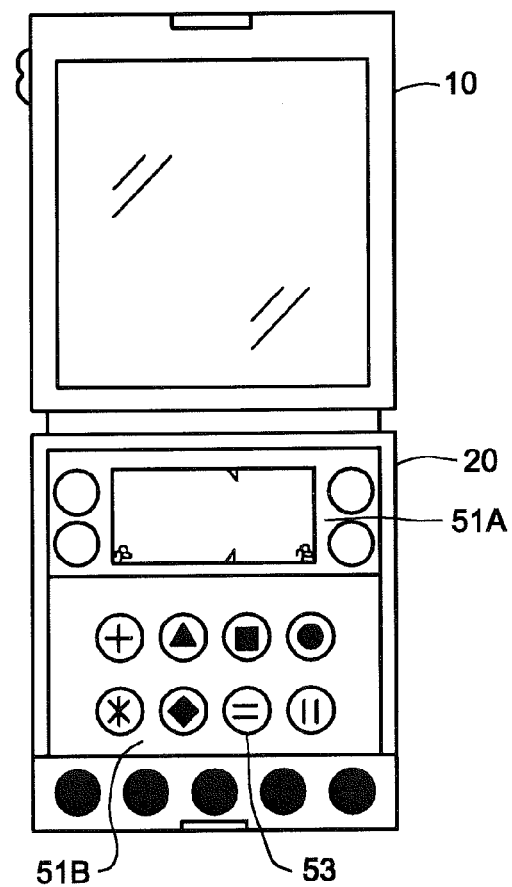
FIG. 7 illustrates a front view of a handheld electronic system, showing one of the variable template input areas implemented as an application shortcut launcher template in accordance with an embodiment of the present invention.

FIG. 7 illustrates a front view of a handheld electronic system (e.g., a personal digital assistant 100), showing one of the variable template input areas implemented as an application shortcut launcher template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as an application shortcut launcher template 51B. It should be understood that the application shortcut launcher template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The application shortcut launcher template 51B includes a plurality of application shortcuts 53. Each application shortcut 53 invokes a corresponding application. In an embodiment, the application shortcuts 53 are individually programmable by the user. In another embodiment, the application shortcuts 53 are automatically programmed to correspond to a predetermined number of previously invoked applications. Hence, the application shortcuts 53 can automatically adjust to the application usage habits of the user. In practice, the user utilizes a stylus to tap on the application shortcut 53 (on the application shortcut launcher template 51B) corresponding to the application the user desires to select. It should be understood that the user can perform a gesture other than a tap to make his/her selection.

Figure 8:
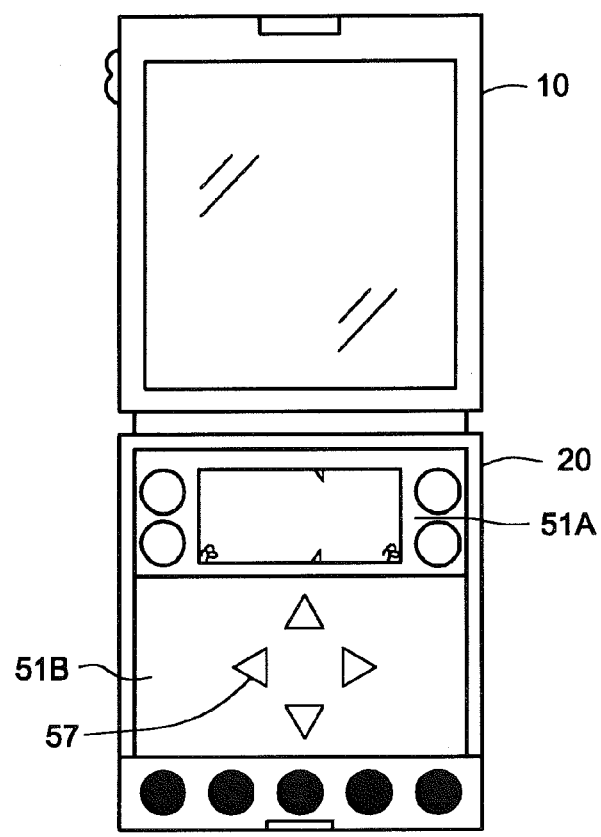
FIG. 8 illustrates a front view of a handheld electronic system, showing one of the variable template input areas implemented as an electronic game control template in, accordance with an embodiment of the present invention.

FIG. 8 illustrates a front view of a handheld electronic system (e.g., a personal digital assistant 100), showing one of the variable template input areas implemented as an electronic game control template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as an electronic game control template 51B. It should be understood that the electronic game control template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The electronic game control template 51B includes a plurality of electronic game controls 57. Each electronic game control 57 corresponds to a particular function (e.g., up, down, right, left, etc.) performed while playing an electronic game, whereas the electronic game is executed on the personal digital assistant 100 or is executed on another device connected (e.g., wireless connection, wired connection, etc.) to the personal digital assistant 100. In an embodiment, the user utilizes a stylus to tap on the electronic game control 57 (on the electronic game control template 51B) corresponding to the particular function the user desires to select. It should be understood that the user can perform a gesture other than a tap to make his/her selection. In another embodiment, the user utilizes a finger or thumb to push on the electronic game control 57 (on the electronic game control template 51B) corresponding to the particular function the user desires to select.

Figure 9:
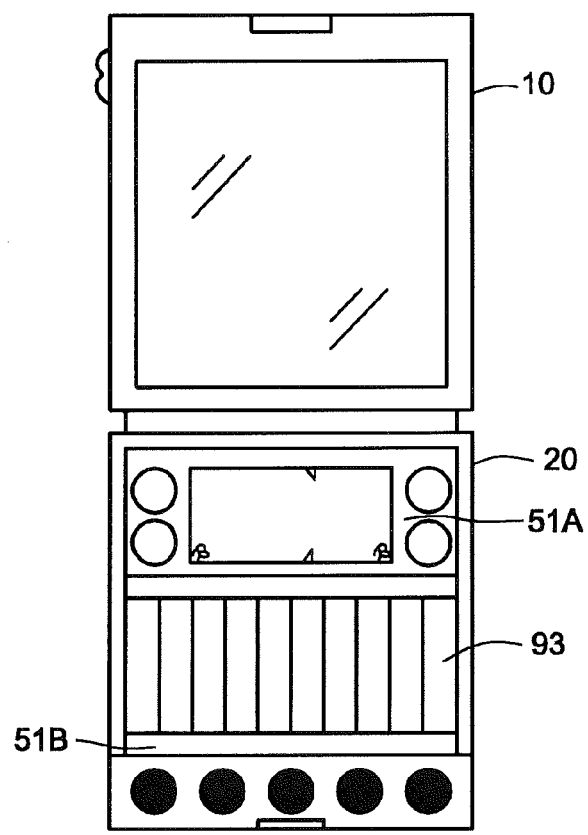
FIG. 9 illustrates a front view of a handheld electronic system, showing one of the variable template input areas implemented as a music keyboard template in accordance with an embodiment of the present invention.

FIG. 9 illustrates a front view of a handheld electronic system (e.g., a personal digital assistant 100), showing one of the variable template input areas implemented as a music keyboard template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as a music keyboard template 51B. It should be understood that the music keyboard template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The music keyboard template 51B includes a plurality of music keys 93. In practice, the user utilizes a stylus to tap on the music key 93 (on the music keyboard template 51B) the user desires to select. It should be understood that the user can perform a gesture other than a tap to make his/her selection.

Figure 10:
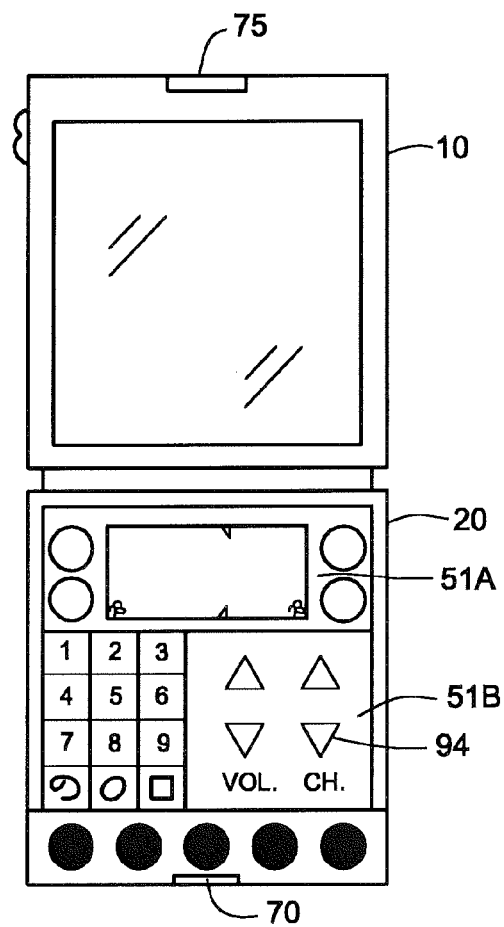
FIG. 10 illustrates a front view of a handheld electronic system, showing one of the variable template input areas implemented as a television remote control template in accordance with an embodiment of the present invention.

FIG. 10 illustrates a front view of a handheld electronic system (e.g., a personal digital assistant 100), showing one of the variable template input areas implemented as a television remote control template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as a television remote control template 51B. It should be understood that the television remote control template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The television remote control template 51B includes a plurality of television controls 94. In practice, the user utilizes a stylus to tap on the television control 94 (on the television remote control template 51B) the user desires to select. It should be understood that the user can perform a gesture other than a tap to make his/her selection. Moreover, the personal digital assistant 100 is able to communicate with the television via a communication port (e.g., an infrared communication port 75, a serial communication port 70, a radio frequency communication port (not shown), etc.).

Figure 11:
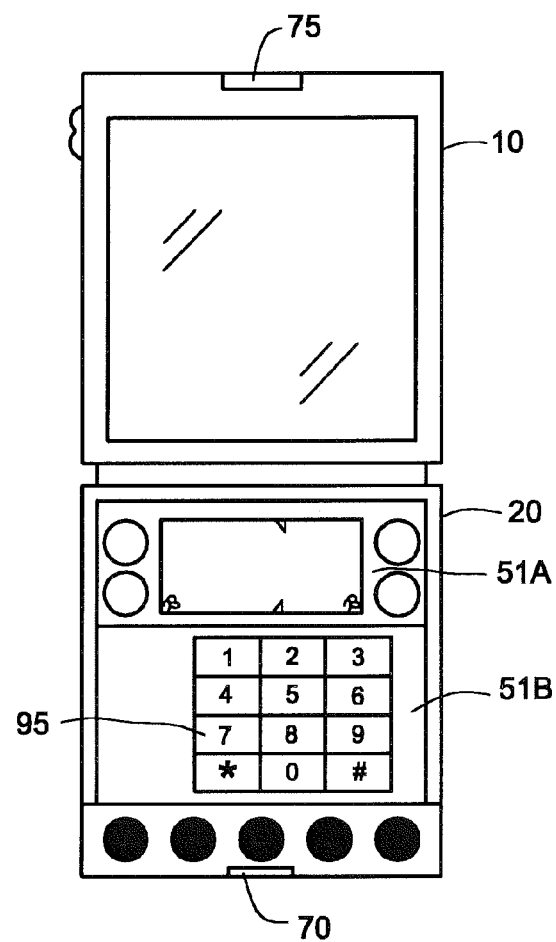
FIG. 11 illustrates a front view of a handheld electronic system, showing one of the variable template input areas implemented as a telephone dialing pad template in accordance with an embodiment of the present invention.

FIG. 11 illustrates a front view of a handheld electronic system (e.g., a personal digital assistant 100), showing one of the variable template input areas implemented as a telephone dialing pad template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as a telephone dialing pad template 51B. It should be understood that the telephone dialing pad template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The telephone dialing pad template 51B includes a plurality of telephone dialing keys 95. In practice, the user utilizes a stylus to tap on the telephone dialing key 95 (on the telephone dialing pad template 51B) the user desires to select. It should be understood that the user can perform a gesture other than a tap to make his/her selection. Moreover, the personal digital assistant 100 is able to communicate with the telephone line system via a communication port (e.g., an infrared communication port 75, a serial communication port 70, a radio frequency communication port (not shown), etc.).

Figure 12:
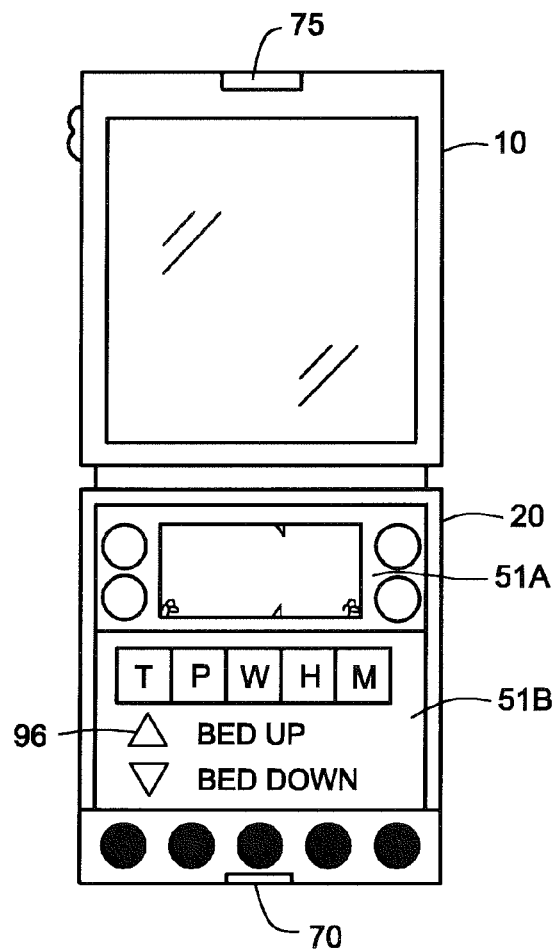
FIG. 12 illustrates a front view of a handheld electronic system, showing one of the variable template input areas implemented as an application interface template in accordance with an embodiment of the present invention.

FIG. 12 illustrates a front view of a handheld electronic system (e.g., a personal digital assistant 100), showing one of the variable template input areas implemented as an application interface template 51B in accordance with an embodiment of the present invention. The personal digital assistant 100 includes an electronic display module 10 and a handwriting recognition module 20. The handwriting recognition module 20 includes a handwriting recognition input area 51A and a variable template input area implemented as an application interface template 51B. It should be understood that the application interface template 51B can be implemented within one of the variable template input areas of the removable template (FIG. 2) in accordance with the first embodiment of the present invention and can be implemented within one of the variable template input areas of the removable data input device (FIG. 4) in accordance with the second embodiment of the present invention.

The application interface template 51B includes a plurality of application interface features 96, whereas the application interface features 96 are unique to the corresponding application. As described above, each application interface template 51B has a corresponding application. The application interface template 51B facilitates an interface between the corresponding application and the user. FIG. 12 illustrates, as an example, an application interface template 51B corresponding to a medical application. For example, the application interface template 51B has application interface features 96 which enable the doctor to raise and lower the patient's bed, which provide the vital signs of the patient, which provide the medical history of the patient, and which provide the prescription history of the patient.

In practice, the user utilizes a stylus to tap on the application interface feature (on application interface template 51B) the user desires to select. It should be understood that the user can perform a gesture other than a tap to make his/her selection. Moreover, the personal digital assistant 100 is able to communicate with another device or appliance via a communication port (e.g., an infrared communication port 75, a serial communication port 70, a radio frequency communication port (not shown), etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable electronic system comprising:
   a processor;
   a bus coupled to said processor;
   an electronic display device coupled to said bus;
   a memory device coupled to said bus; and
   a user removable data input device providing a plurality of different methods of data input to the portable electronic system coupled to said bus, said user removable data input device comprising:
      a data input surface for detecting a gesture performed thereon by a user and for facilitating recognition of said gesture as corresponding to a particular data input, wherein said data input surface is responsive to a touch thereon and is in a location relative to a perimeter of said electronic display device that is spaced from the electronic display device, wherein said data input surface has one of a plurality of marking configurations, wherein each marking configuration facilitates operating said data input surface in one of a plurality of functional configurations, wherein said data input surface includes a first data input area and a second data input area, wherein said first data input area is configured to facilitate recognition of one or more first gestures, and wherein said second data input area is configured to facilitate recognition of one or more second gestures associated with one of said functional configurations, and wherein said user removable data input device is configured to couple to said portable electronic system and to uncouple from said portable electronic system.

2. A portable electronic system as recited in claim 1 wherein said one or more first gestures correspond to a plurality of handwriting strokes.

3. A portable electronic system as recited in claim 1 wherein said second data input area is a keyboard template wherein a keyboard character is selected by performing said one or more second gestures.

4. A portable electronic system as recited in claim 1 wherein said second data input area is an application shortcut launcher template wherein any one of a plurality of applications is selected by performing said one or more second gestures.

5. A portable electronic system as recited in claim 4 wherein said plurality of applications correspond to a predetermined number of previously invoked applications.

6. A portable electronic system as recited in claim 1 wherein said second data input area is an electronic game control template wherein any one of a plurality of electronic game controls is selected by performing said one or more second gestures.

7. An electronic system as recited in claim 1 wherein said electronic system comprises a first module and a second module, wherein said first module includes said electronic display device, and wherein said second module includes said user removable data input device.

8. A portable electronic system as recited in claim 1 wherein said electronic system comprises a personal digital assistant.

9. A portable electronic system as recited in claim 1 wherein said user removable data input device includes a mechanism for automatically configuring said electronic system to recognize said user removable data input device.

10. A portable electronic system as recited in claim 1 further comprising one or more communication ports.

11. A portable electronic system comprising:
a processor;
a bus coupled to said processor;
an electronic display device coupled to said bus;
a memory device coupled to said bus; and
a data input device coupled to said bus and configured to provide multiple different methods of data input to the portable electronic system, said data input device comprising:
a data input surface for detecting a gesture performed thereon by a user and for facilitating recognition of said gesture as corresponding to a particular data input, wherein said data input surface is responsive to a touch thereon and is spaced apart from the display device, and a user removable template having one of a plurality of marking configurations, wherein each marking configuration facilitates operating said data input surface in one of a plurality of functional configurations, wherein said user removable template is positioned over said data input surface for dividing said data input surface into a first data input area and a second data input area, wherein said first data input area is configured to facilitate recognition of one or more first gestures, and wherein said second data input area is configured to facilitate recognition of one or more second gestures associated with one of said functional configurations.

12. An electronic system as recited in claim 11 wherein said one or more first gestures correspond to a plurality of handwriting strokes.

13. An electronic system as recited in claim 11 wherein said second data input area is a keyboard template wherein a keyboard character is selected by performing said one or more second gestures.

14. An electronic system as recited in claim 11 wherein said second data input area is an application shortcut launcher template wherein any one of a plurality of applications is selected by performing said one or more second gestures.

15. An electronic system as recited in claim 14 wherein said plurality of applications correspond to a predetermined number of previously invoked applications.

16. An electronic system as recited in claim 11 wherein said second data input area is an electronic game control template wherein any one of a plurality of electronic game controls is selected by performing said one or more second gestures.

17. An electronic system as recited in claim 11 wherein said electronic system comprises a first module and a second module, wherein said first module includes said electronic display device, and wherein said second module includes said data input device.

18. An electronic system as recited in claim 11 wherein said electronic system comprises a personal digital assistant.

19. An electronic system as recited in claim 11 further comprising one or more communication ports.

20. An electronic system as recited in claim 11 wherein said electronic system is of a clamshell configuration.

21. A data input device configured to provide multiple data input methods in a portable electronic system, comprising:
a data input surface for detecting a gesture performed thereon by a user and for facilitating recognition of said gesture as corresponding to a particular data input, wherein said data input surface is responsive to a touch thereon and is in a location relative to a perimeter of a display device that is spaced from the display device; and
a user removable template having one of a plurality of marking configurations, wherein each marking configuration facilitates operating said data input surface in one of a plurality of functional configurations, wherein said user removable template is positioned over said data input surface for dividing said data input surface into a first data input area and a second data input area, wherein said first data input area is configured to facilitate recognition of one or more first gestures, and wherein said second data input area is configured to facilitate recognition of one or more second gestures associated with one of said functional configurations, the user by changing the user removable template capable of controlling multiple devices which are integrated into the electronic system.

22. A data input device as recited in claim 21 wherein said one or more first gestures correspond to a plurality of handwriting strokes.

23. A data input device as recited in claim 21 wherein said second data input area is a keyboard template wherein a keyboard character is selected by performing said one or more second gestures.

24. A data input device as recited in claim 1 wherein said second data input area is an application shortcut launcher template wherein any one of a plurality of applications is selected by performing said one or more second gestures.

25. A data input device as recited in claim 24 wherein said plurality of applications correspond to a predetermined number of previously invoked applications.

26. A data input device as recited in claim 1 wherein said second data input area is an electronic game control template wherein any one of a plurality of electronic game controls is selected by performing said one or more second gestures.

27. A user removable data input device configured to provide multiple data input ways in a portable electronic system, comprising:
 a data input surface for detecting a gesture performed thereon by a user and for facilitating recognition of said gesture as corresponding to a particular data input, wherein said data input surface is responsive to a touch thereon and is in a location relative to a perimeter of a display device that is spaced from the display device, wherein said data input surface has one of a plurality of marking configurations, wherein each marking configuration facilitates operating said data input surface in one of a plurality of functional configurations, wherein said data input surface includes a first data input area and a second data input area, wherein said first data input area is configured to facilitate recognition of one or more first gestures, and wherein said second data input area is configured to facilitate recognition of one or more second gestures associated with one of said functional configurations, and
 wherein said user removable data input device is configured to couple to the electronic system and to uncouple from said electronic system.

28. A user removable data input device as recited in claim 27 wherein said one or more first gestures correspond to a plurality of handwriting strokes.

29. A user removable data input device as recited in claim 27 wherein said second data input area is a keyboard template wherein a keyboard character is selected by performing said one or more second gestures.

30. A user removable data input device as recited in claim 27 wherein said second data input area is an application shortcut launcher template wherein any one of a plurality of applications is selected by performing said one or more second gestures.

31. A user removable data input device as recited in claim 30 wherein said plurality of applications correspond to a predetermined number of previously invoked applications.

32. A user removable data input device as recited in claim 27 wherein said second data input area is an electronic game control template wherein any one of a plurality of electronic game controls is selected by performing said one or more second gestures.

33. A user removable data input device as recited in claim 27 wherein said electronic system comprises a personal digital assistant.

34. A user removable data input device as recited in claim 27 further comprising a mechanism for automatically configuring said electronic system to recognize said user removable data input device.

\* \* \* \* \*